United States Patent [19]

Schneider

[11] Patent Number: 5,201,243

[45] Date of Patent: Apr. 13, 1993

[54] HANDLEBAR ASSEMBLY

[76] Inventor: Darryl M. Schneider, P.O. Box 291121, Tampa, Fla. 33687

[21] Appl. No.: 896,342

[22] Filed: Jun. 10, 1992

Related U.S. Application Data

[63] Continuation-in-part of Ser. No. 695,716, May 6, 1991, abandoned.

[51] Int. Cl.$^5$ .................... B62K 21/12; B62K 21/26
[52] U.S. Cl. ............................ 74/551.1; 74/551.3
[58] Field of Search ............... 74/551.1, 551.3, 551.4, 74/551.5, 551.8; 280/278, 287

[56] References Cited

U.S. PATENT DOCUMENTS

| | | | |
|---|---|---|---|
| 3,505,901 | 4/1970 | Stone | 74/551.4 |
| 4,310,260 | 1/1982 | Katayama | 74/551.1 X |
| 4,503,729 | 3/1985 | Shimano | 74/551.1 |
| 4,688,817 | 8/1987 | Marier | 280/278 |
| 4,750,754 | 6/1988 | Lennon | 188/24.22 X |
| 4,873,886 | 10/1987 | Renner | 74/551.1 X |
| 4,878,397 | 11/1989 | Lennon | 74/551.1 |
| 4,930,798 | 6/1990 | Yamazaki et al. | 74/551.1 X |
| 4,939,950 | 7/1990 | Girvin | 74/551.1 X |
| 5,000,469 | 3/1991 | Smith | 74/551.1 X |
| 5,033,325 | 7/1991 | Giard, Jr. | 74/551.3 |
| 5,094,322 | 3/1992 | Casillas | 74/551.8 X |

FOREIGN PATENT DOCUMENTS

| | | | |
|---|---|---|---|
| 91/04903 | 4/1991 | PCT Int'l Appl. | 74/551.1 |
| 294395 | 7/1928 | United Kingdom | 74/551.4 |

OTHER PUBLICATIONS

"The Only Ergonomically Engineered Adjustable Handlebar Profile Leader by Design", 1990.

Primary Examiner—Rodney H. Bonck
Assistant Examiner—Ryan W. Massey

[57] ABSTRACT

A handlebar assembly for a bicycle provides hand grips on tubular segments that have their upper ends turned inward and back so that the cyclist's wrists assume a normal and unstressed position. The assembly is adapted to suit a cyclist's preference by the use of variable length segments. In order to provide a wide selection of hand grip positions, segments are connected with joints that have an outer diameter approximately equal to that of the tubing.

9 Claims, 11 Drawing Sheets

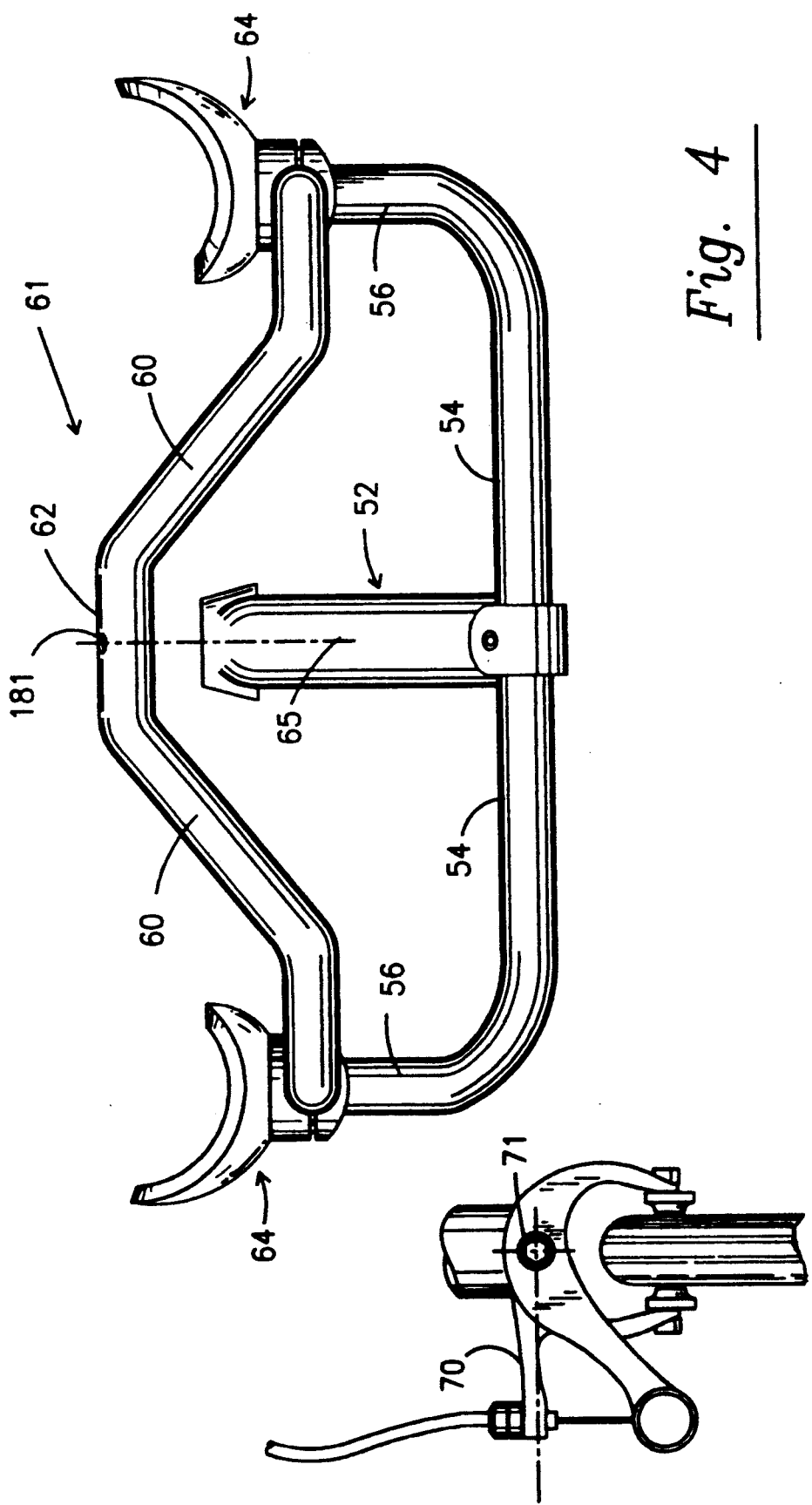

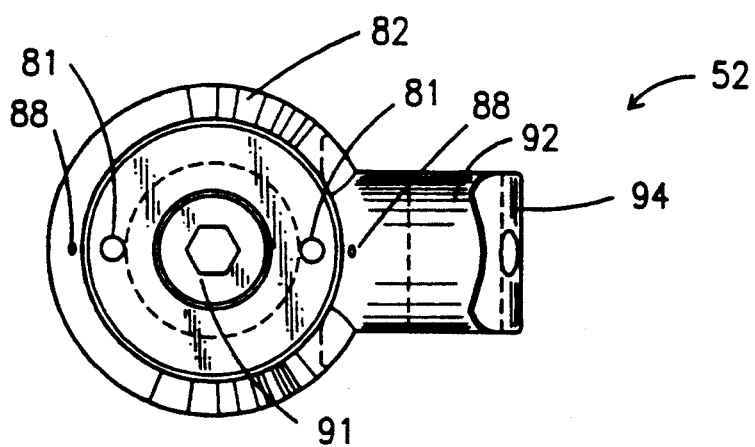
Fig. 7
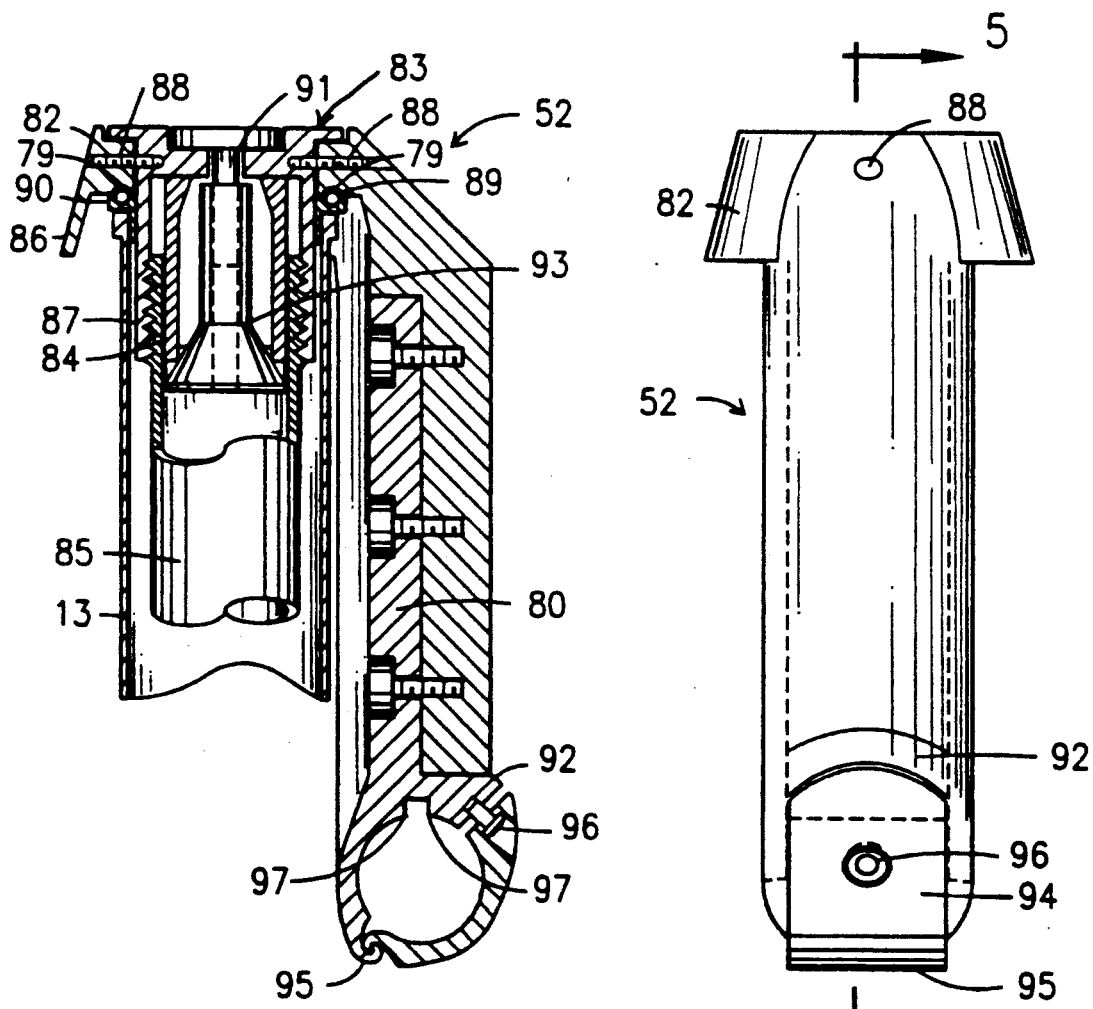
Fig. 5
Fig. 6

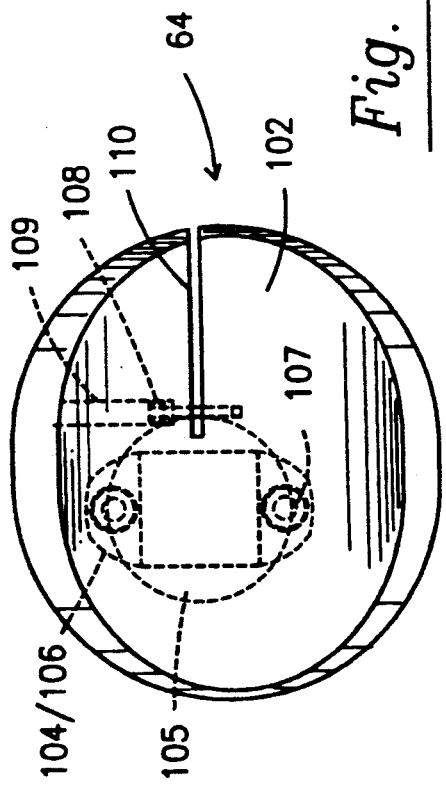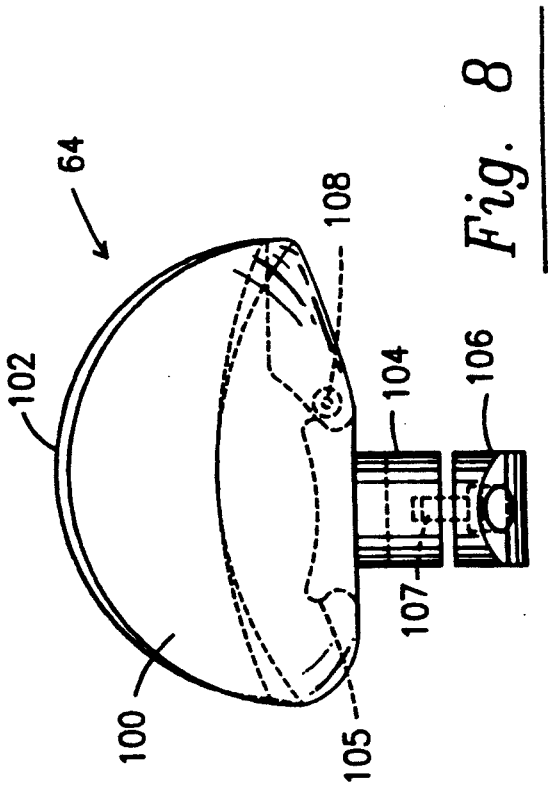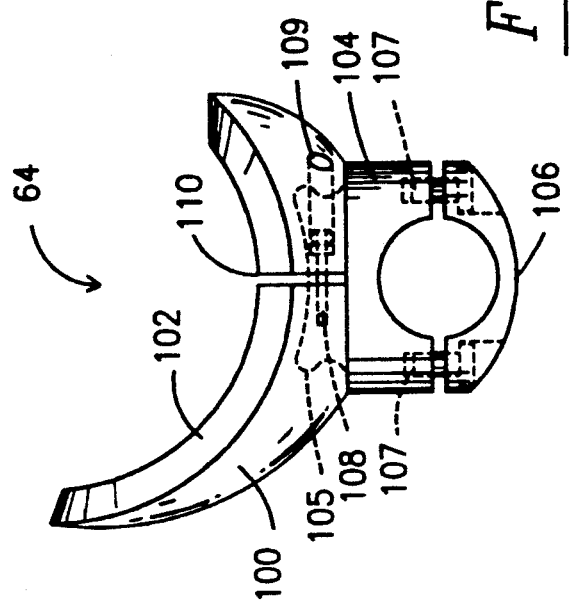

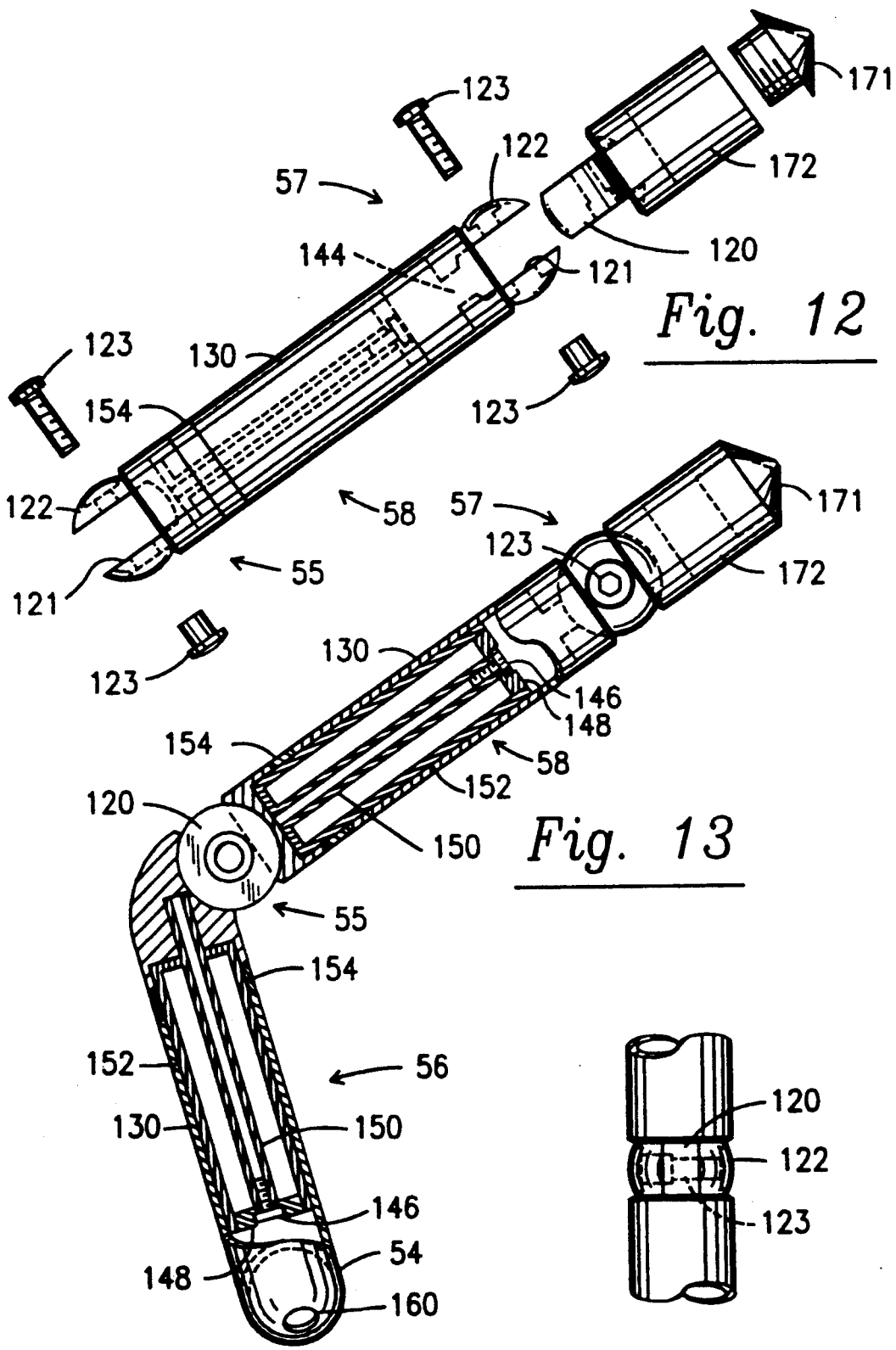

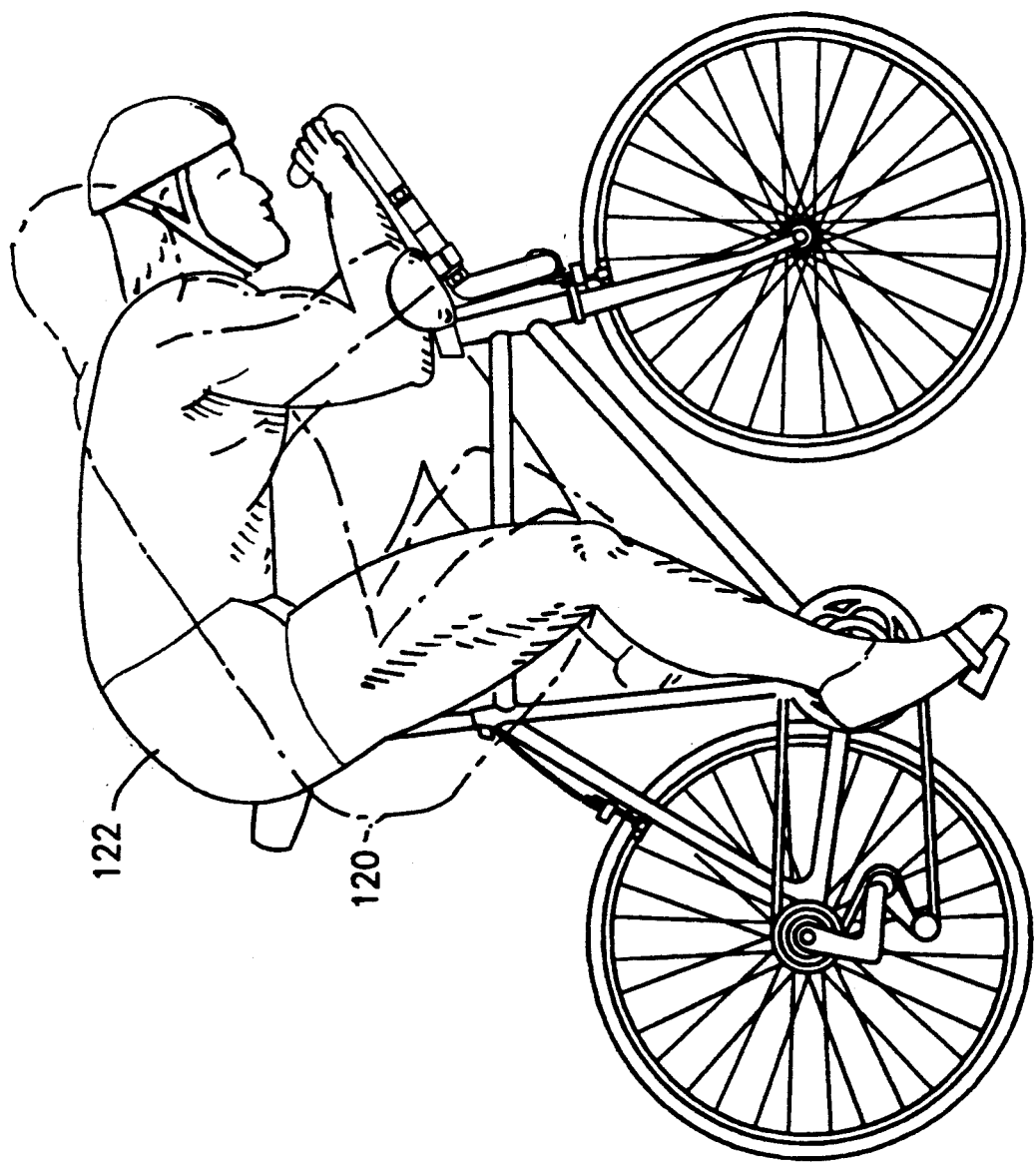

HANDLEBAR ASSEMBLY

CROSS-REFERENCE TO RELATED APPLICATION

This application is a continuation in part of U.S. application Ser. No. 07/695,716, filed May 6, 1991, now abandoned.

TECHNICAL FIELD

The present invention relates generally to a handlebar assembly for steering a bicycle and, particularly, to a novel handlebar assembly for a bicycle that allows greater bicycle cranking leverage: An obtained posture that facilitates one to better apply greater force to the pedals of a bicycle and intensifies the direction of motion of the legs by accommodating a steeper seat angle. The invention repositions one's body parts, changing one's pose to one used in power squat weight lifting and track sprinting on foot and provides improved steering ability and safety characteristics.

BACKGROUND OF THE INVENTION

Two of the most popular conventional handlebar designs in general use are the aero and ram-type handlebars; and the ram-type handlebars are standard equipment on most bicycle models. In both designs two parallel, forward extending hand grips are spaced narrowly apart and located at a relatively high position, thereby urging the cyclist into a more upright position on the bicycle. This is sufficient for lower speed, recreational cycling, but because the cyclist will have a relatively large frontal area exposed, drag force will result that becomes increasingly significant at higher speed, e.g. above approximately 30 M.P.H. Also, another significant drawback of this design is that the posture of the cyclist during riding creates a pocket in front of and below the cyclist's shoulders that traps air and results in a continuous drag force that becomes increasingly significant at higher speeds.

Both type handlebar designs do not allow for optimum cranking leverage by the cyclist. The optimum cranking leverage is the greatest force possible that can be applied to the pedals of a bicycle for greater torque and increased bicycle speed all due to an optimal positioning or posture of one's body parts.

The cranking leverage afforded by the ram-type handlebars is not optimum, and the cyclist is subject to discomfort and fatigue, because the weight of the cyclist's upper body is supported primarily through his arms which are in a continuous state of muscular exertion. Also the positioning of the ram-type and aero handlebars, when used with a standard handlebar stem, may interfere with the cyclist's knees and/or thighs during vigorous cranking, as during start-up or climbing. This is particularly the case of competition bicycles which have a smaller wheel base or which otherwise have the saddle positioned closer to the handlebar assembly.

This is an improved design for longer distance cycling and short competition racing, because the cyclist's upper torso is bent downward. This decreases the amount of frontal area exposed, thus reducing the air drag force and improving the cyclist's cranking leverage relative to a cyclist using ram-type or aero handlebars.

In an attempt to solve some of these problems in the conventional ram-type handlebars, the so-called "aero" bar was developed as an attachment to the handlebars. In the aero bar design, the hand grips are located forward of the bicycle handlebar stem and spaced relatively close together. The hand grips typically are connected together at their forward ends to form a generally wedge shaped, forward pointing handlebar construction. Because the hand grips are positioned further forward than the hand grips in conventional ram-type handlebars, a cyclist will lean forward to a greater extent, thus reducing his or her frontal surface area and moderately decreasing the air drag. However, because the cyclist's arms are positioned relatively close together, the cyclist's upper torso or body cannot be positioned lower to eliminate the drag-generating air pocket it causes or stop the muscle strain of having to raise one's thighs so close to one's stomach. Also, unlike the ram-type handlebar design, the aero bar design is not legal for mass start racing events.

Notwithstanding the improvements provided by the aero bar design in some areas, it still does not achieve optimal cranking leverage, respiration, speed, comfort, and safety. It strives for only a streamlined frontal surface or area, and sacrifices in stability and safety are made.

SUMMARY OF THE INVENTION

The present invention provides an improved handlebar assembly for all bicycles in allowing for greater bicycle cranking leverage. Also the invention provides for improved steering and better safety characteristics as compared with conventional racing handlebar assemblies, all while increasing the comfort of the cyclist during short or extended cycling.

In accordance with the invention, the standard handlebar stem, which normally extends upward a few inches from the bicycle head tube and forward a few inches, is replaced by a handlebar step which, as much as possible, is flush with the top of the bicycle head tube and includes a depending connector that clamps the handlebar assembly to the bicycle near the bottom of the bicycle head tube. The bicycle handlebar assembly includes a cross bar that is secured at its center to the depending connector of the steering post and extends on either side of the plane of the bicycle frame set approximately to shoulder width. The cross bar terminates on each side in a support section which extends generally upward and rearward approximately to the height of the top of the bicycle head tube.

A pair of hand grips are connected generally in front of the cross bar and extend generally rearward and inward. The hand grips are secured to the handlebar assembly through structural members or support sections connected to the cross bar which initially extends upwards and backwards from the ends of the cross bar. A forearm rest is provided on each side of the handlebar assembly near the upper extent of the support sections. The forearm rests are spaced apart slightly wider than shoulder width.

With this novel handlebar assembly construction, there is no interference with the cyclist's legs during cranking because the cross bar of the handlebar assembly is below the movement of the knees and thighs. Moreover, with the rearwardly extending hand grip design, the wider and further rearward positioning of the forearm rests, and the short height profile of the substituted handlebar stem, the cyclist is able to comfortably lean his upper body parts further downward and arch his upper torso more so for increased aerodynamics due to the no-pocket posture of the torso allowing for the maximum cranking leverage. The cyclist's body posture is more aerodynamic because the cyclist's upper torso can lean down between the arms and eliminate the air pocket formed by the body's posture induced by conventional handle designs. The wider placement of the forearm rests also provides for increased stability of the bicycle and allows for easier steering and breathing by the cyclist owing to the increased arm span provided by the outside placement of the forearm rests.

The new handlebar assembly and steering post stem also allow a repositioning of the seat post of the bicycle, from the standard angle of about 17 degrees from vertical to approximately vertical, in order to maximize the degrees of powered rotation or turning of the crank arms during cycling and the downward force of the cyclist's feet on the pedals. The body posture induced by this arrangement maximizes the degrees of forced turning of the crank during cycling, that is, the powered turn and increases the downward force of the cyclist's feet on the pedals. With the seat post at or near vertical and the saddle moved farther forward, the cyclist's "powered turn" will extend as close as possible through the maximum angle of 180 degrees, from approximately a 12 o'clock position of a pedal down through approximately a 6 o'clock position. The new handlebar assembly facilitates this optimal saddle position by establishing the position of the cyclist's arms in a wider position and closer to the saddle as compared with the use of an aero bar handlebar assembly. The result is that the cyclist's body is not elongated, but is made more coiled and compact with the upper body being lowered to the greatest extent, eliminating the air pocket. The cyclist's lower torso is more upright while the upper torso is arched to a greater extent, preventing any interference between the cyclist's thighs and the stomach/chest area during cranking. The cyclist's transfer of body weight also is more stably distributed, and the cyclist's lower back is advantageously more upright for greater freedom of leg movements.

In a preferred embodiment of the invention, the handlebar assembly includes locking joints connecting the sections of the handlebars in order to permit a cyclist to adjust the geometry of the handlebar assembly in two dimensions to suit his or her preference or physical requirements in three dimensions. The forearm rests preferably are cushioned and adjustable and are of a concave shape to comfortably support the cyclist's elbows or forearms. The outside edges of the forearm rests preferably are higher than the inside edges to respond more positively to pressure exerted by the cyclist's forearms during cycling and particularly during steering actions.

Although the maximum benefit of the invention is achieved by the use of all of the various features described above and in this disclosure, it is also advantageous if less than all of those features are incorporated.

BRIEF DESCRIPTION OF THE DRAWING FIGURES

The above and other features and advantages of the invention, as well as a fuller description of the invention itself, will become more apparent to those skilled in the art in view of the following detailed description taken together with the accompanying drawings in which like referenced numerals and labels indicate corresponding parts or elements throughout the several views, and wherein:

FIG. 4 is a front view of the embodiment of the present invention shown in FIG. 2 and shown in FIG. 3 from the B—B line.

FIG. 5 is a side elevational view of a novel handlebar stem that can be used in conjunction with the invention.

FIG. 6 is a front elevational view of the handlebar stem shown in FIG. 5.

FIG. 7 is a top plan view of the handlebar stem shown in FIG. 5.

FIG. 8 is a side elevational view of a preferred forearm rest that can be used in conjunction with the present invention.

FIG. 9 is a front elevational view of the forearm rest shown in FIG. 8.

FIG. 10 is a top plan view of the forearm rest shown in FIG. 8.

FIG. 11 is a top plan view of a joint that can be used in conjunction with the invention to make the geometry of the handlebar assembly adjustable.

FIG. 12 is a partially exploded, top plan view of the joint shown in FIG. 11 and a preferred means for fastening the joint to a tubular portion of the handlebar assembly.

FIG. 13 is a side elevational view of the assembled joint and fastening means shown in FIG. 11.

FIG. 14 is a side elevational view of a cyclist's body posture when a preferred embodiment of the present invention is used as compared with when a conventional handlebar assembly is used.

FIG. 15 is a front elevational view of a preferred brake that can be used in conjunction with the invention.

DETAILED DESCRIPTION OF THE PREFERRED EMBODIMENT

Figure 1:
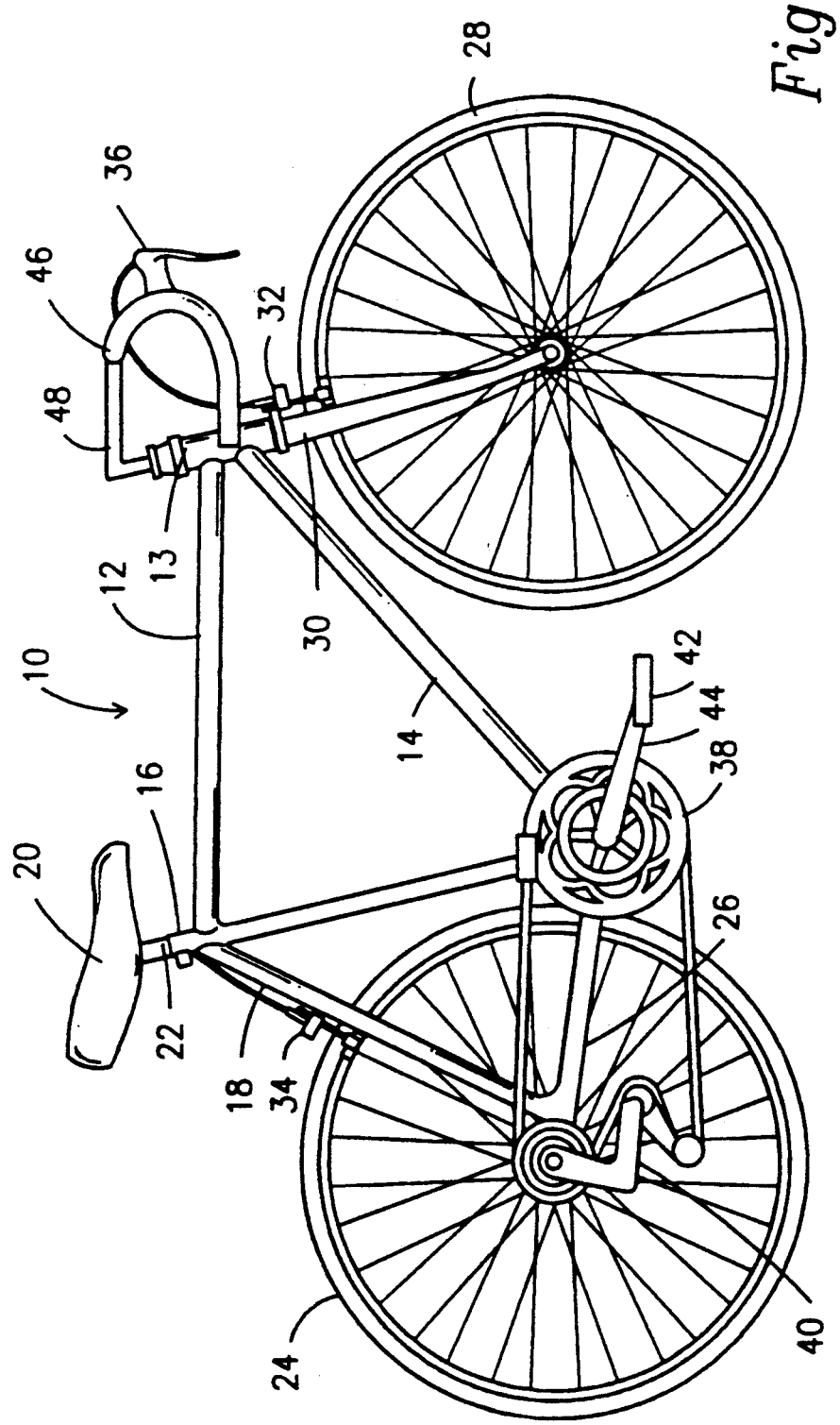
FIG. 1 is a side elevational view of a bicycle, including a conventional handlebar assembly and handlebar stem.

The handlebar assembly of the invention can be substituted for a conventional handlebar assembly on a bicycle as original equipment or as an after market piece of equipment due to the adjustability of the steering post (see FIGS. 18 and 19) in positioning the handlebar assembly. A bicycle with a conventional handlebar assembly is shown in FIG. 1. The bicycle includes a frame set 10 comprised of a top tube 12, a down tube 14, and a seat tube 16. The top tube 12 and the down tube 14 are connected at their forward ends to a head tube 13. A pair of seat stays 18 provide structural support between the rear hub of the bicycle and the seating portion of the bicycle. An adjustable saddle 20 is secured relative to the frame of the bicycle through the seat post 22 which slides within the seat tube 16 and can be secured at a desired height.

A rear wheel 24 is rotatably connected to the bicycle at the rear hub through the seat stays 18 and a pair of chain stays 26. The front wheel 28 of the bicycle is rotatably secured to a front fork 30. A front caliper brake assembly 32 and a rear caliper brake assembly 34 are controlled by a pair of hand brake assemblies 36 in known fashion. The rear wheel 24 is chain driven through the chain wheels 38 and a derailleur assembly 40. A pair of pedals 42 and crank arms 44 drive the chain wheels 38.

The front fork 30 includes a hollow, upwardly extending fork pipe that is rotatably journaled within the head tube 13. A handlebar stem 48 is secured to the fork pipe of the front fork 30 to allow for steering of the bicycle. A conventional ram-type handlebar assembly 46 includes a cross piece, into the plane of the Figure, that is clamped at its center area to the handlebar stem 48. As is shown in FIG. 1, at each end of the cross bar the handlebars bend forward, then downward and backward, terminating in parallel hand grips.

Figure 2:
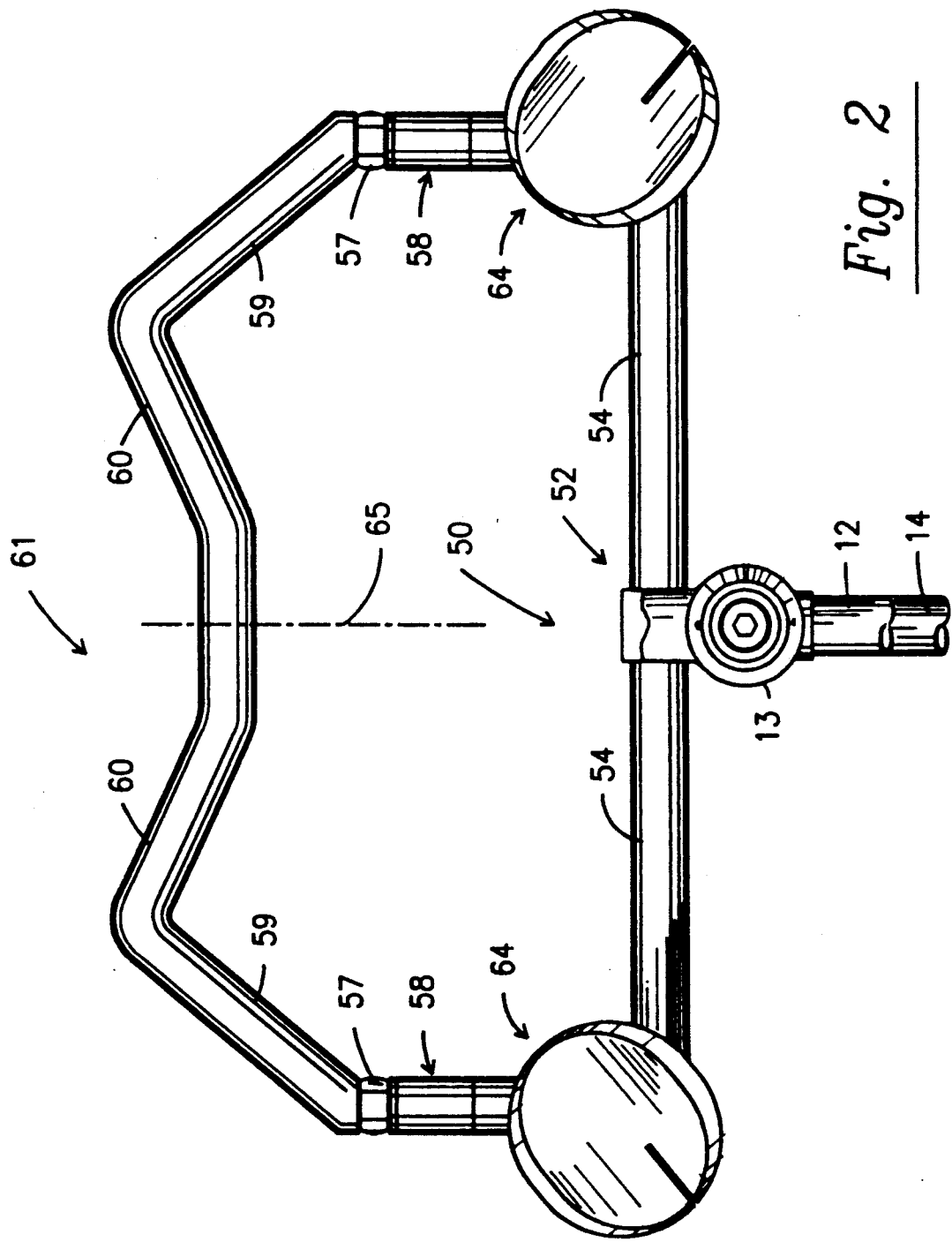
FIG. 2 is a top view of a preferred embodiment of the present invention shown in FIG. 3 from the line A—A.

A preferred embodiment of the present invention is shown in FIG. 2. The handlebar assembly, generally indicated at 50, is secured by a linkage device to an area of the bicycle controlling the steering, which in this case is the fork pipe of fork 30 of the bicycle through which is connected a novel linkage device is the novel handlebar. The construction of the handlebar stem or steering post 52 is significantly different than the conventional handlebar stem construction. In the conventional construction (see FIG. 1), the handlebar stem 48 is vertically adjustable and typically extends upward from the top of the head tube 13 a few inches, bends forward, and extends forward a few inches. The handlebar stem 52 preferably used in the present invention, however, extends downward from the top of the head tube 13 and minimizes the protrusion over the top of the head tube. This is one way of using the steering post 52. This steering post 52 is nonadjustable from its attachment point at any location from which the bicycle may be steered.

The handlebar assembly 50 includes a cross piece 54 which is releasably clamped to the handlebar stem 52 at approximately the center of the cross piece. The cross piece 54 can be one piece as shown in FIG. 2 or can be segmented, for example, by splitting the cross piece 54 at its center area and positioning the two pieces either forward or backward of the head tube. These ends may be connected with the fork pipe through the head tube, using perhaps a rotating T-piece head tube portion for insertion of the cross bar ends through this part of the head tube to the fork pipe. The cross piece 54 extends laterally on each side of the plane of the bicycle frame set and is generally straight, although the laterally extending portions of the cross piece may be contoured or bent slightly for a more comfortable and secure grip when the cyclist is grasping this portion of the handlebar assembly. The top of the cross piece 54 preferably is lower than the top of the head tube 13.

It should be noted that it is not strictly necessary that the center portion of the cross piece 54 be dropped to the same extent as the lateral portions of the cross piece because the center portion is not in danger of interfering with the knees of the cyclist during riding. Thus, the center portion of the cross piece 54 may be clamped to the handlebar stem 52 at a higher or lower position, but in such a case would be connected to the laterally extending side portions of the cross piece 54 by suitable connecting structural members.

Each end of the cross piece 54 terminates in a generally upwardly and rearwardly extending support section 56. As is more clearly shown in FIG. 3, the support sections 56 are preferably oriented at the rearward angle of the bicycle head tube 13 which typically is about 17 degrees from vertical. In this case it is seen that the top of the support sections 56 actually extend behind the point of connection between the cross piece 54 and the handlebar stem 52. Each support section 56 is connected to a forwardly extending section 58 through a locking joint 55 described further below.

A hand grip portion of the handlebar assembly is indicated generally as 61 and is connected to the forwardly extending sections 58 through the locking joints 57. The hand grip portion 61 comprises the inwardly angled sections 59 and the hand grip sections 60, which are interconnected by the center section 62. The hand brake assemblies, not shown, conveniently can be positioned along the inwardly angled sections 59 where they can be accessed quickly and easily during cycling by removing the hands from the hand grip sections 60.

The handlebar sections 54, 56, 58, 59, 60 and 62 can conveniently be formed from metal tubing as is used in the construction of conventional handlebar assemblies. The thickness of the tubing can be increased in areas of more stress, for example, at bends in the tubing and at the center portion of the cross piece 54 where the cross piece is secured to the handlebar stem 52.

For greater structural strength and rigidity, as well as a more positive and comfortable grip by the cyclist, oversized tubing is used in the construction of the handlebar assembly of the present invention, at least at the locations where the cyclist may grip the handlebar assembly. Preferably a tubing with an inside diameter of at least 25.5 mm is used with an outside diameter of at least 28.5 mm being the most preferred. The tubing can be 6061 T6 aluminum tubing having a preferred wall thickness of about 1.5 mm.

Forearm or arm rests 64 are mounted on the handlebar 50, so that when the cyclist is grasping the hand grip sections 60, the cyclist's elbows or forearms can rest comfortably on the arcuate rests 64 and transfer or apply a greater force or weight to the bicycle pedals. The cyclist can also push against the rests 64 with the forearms to obtain additional leverage for applying greater force to the bicycle pedals. In the present invention, the height of the support sections 56 are adjustable using the non-bolt adjusting means (see FIG. 13) described further below and are ideally chosen so that the rests 64 support the cyclist's arms slightly below the top of the head tube 13, thus inducing a more favorable, downward lean of the cyclist's shoulders. The rests 64 preferably are spaced apart slightly wider than shoulder width and can be spaced apart much greater than shoulder width to avoid constricting the cyclist's chest area and facilitate a lower positioning of the cyclist's upper torso between the arms during cycling.

It can be seen that this handlebar construction affords a variety of alternative hand grip locations that can be used by the cyclist in different riding positions. When in a semi-standing position for vigorous cranking, as during a start-up and when accelerating quickly, the cyclist can grip the laterally extending portions of the cross piece 54 on either side of the bicycle head tube. In this case the cross piece 54 acts as a conventional "break away" bar and without changing the positioning of any of the other parts of the handlebar assembly and consequently the angle of one's body parts.

The cyclist can also grip the handlebar assembly in front of the arm rests 64 along the forwardly extending sections 58 or the inwardly angled sections 59. If the forearm rests 64 are positioned further forward on the handlebar assembly than is shown in the Figures, the cyclist can also grip the forwardly extending sections 58 behind the forearm rests 64. Of course, depending on the construction of the arm rests 64, the cyclist can grip the forearm rests themselves, if the forearm rests 64 are cushioned sleeves closely conforming to or fitting the tubing of sections 58.

Figure 3:
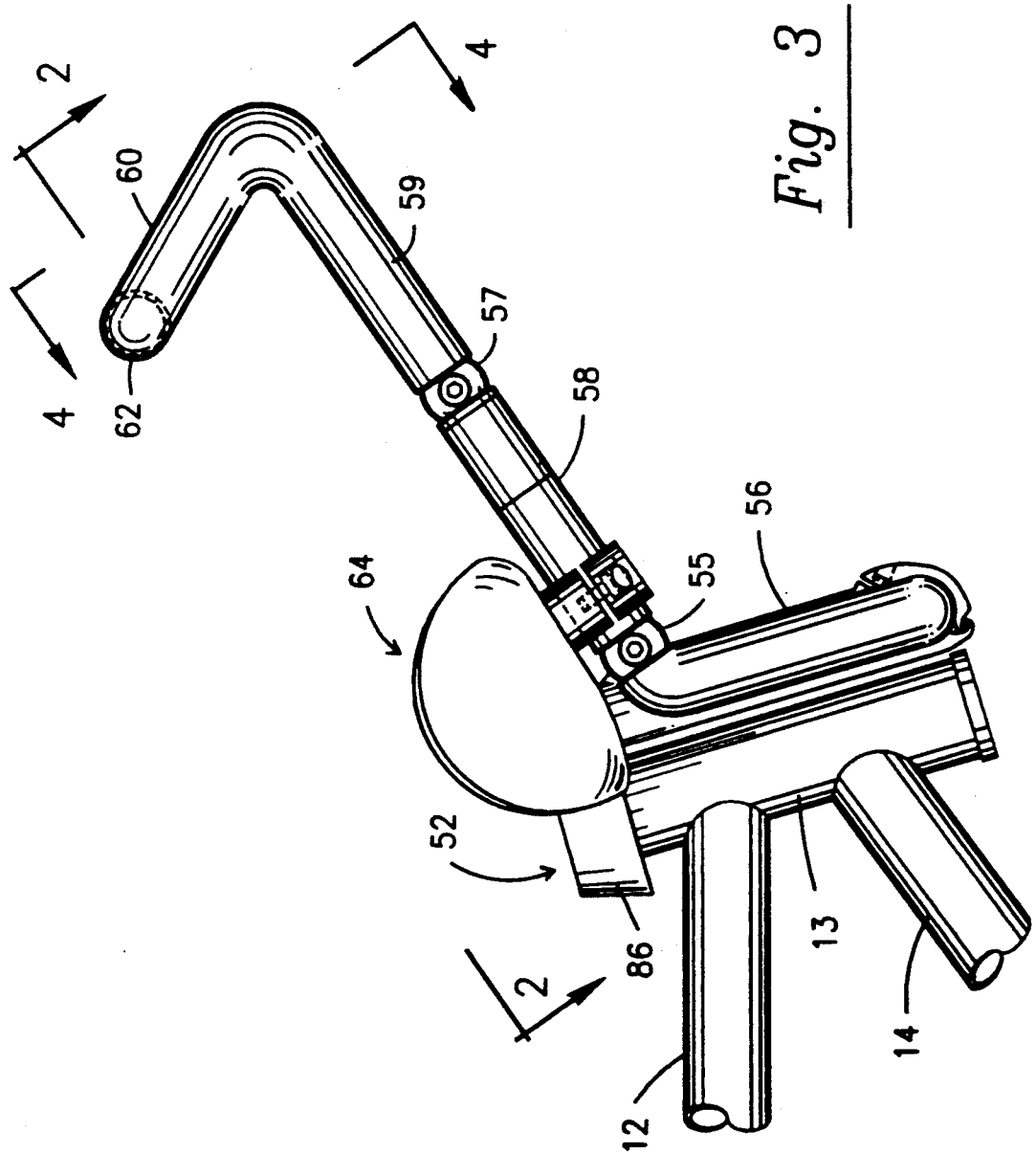
FIG. 3 is a side elevational view of the embodiment of the present invention shown in FIG. 2 mounted on a conventional bicycle frame set.

In a preferred construction of the handlebar assembly incorporating the locking joints 55, 57, the positioning of the forwardly adjustable extending sections 58 (see FIGS. 12 and 13) and the hand grip portion 61 are adjustable in two dimensions in order to customize the geometry of the handlebar assembly for a cyclist's particular preference or for cyclists of different physical proportions. By rotating the forwardly extending sections 58 in a vertical plane from a pivot point at the joints 55, the cyclist can adjust the angle of his grip on these handlebar sections as well as adjust the height, angle, and, to some extent, the forward position of the hand grip portion 61 of the handlebar assembly, consequently widening or narrowing the position of one's arms. Locking joints 57 in turn allow the cyclist to further adjust the angle of the hand grip portion 61 from a pivot point at those locking joints. The combination of these joints allows a cyclist to adjust one part of the handlebar assembly without changing the configuration of the other parts of the handlebar assembly. It has been found that a comfortable geometry of the handlebar assembly is achieved by orienting the forwardly extending sections 58 and the inwardly angled sections 59 at an angle to or moderately above horizontal, as best seen in FIG. 3. The geometry chosen will depend on, among other things, the degree of desired extension of the cyclist's arms and the height and position of the saddle.

Additional or fewer locking joints may be provided, or the locking joints may be provided at different locations in the handlebar assembly. As one example, additional locking joints can be provided at the juncture between the generally upward and backward extending support section 60 and section 59.

A principal feature in this preferred embodiment of the present invention is that the hand grip sections 60 of the invention extend rearwards (see especially FIGS. 2-3). That is, the hand grip sections 60 extend rearwardly behind the most forward extent of the handlebar assembly, so that the cyclist's hand grip on the hand grip sections 60, in the direction from the small finger to the index finger, also extends rearwardly. This is in contrast to conventional aero bar handlebar designs in which the hand grips extend forward and is the only direction one can comfortably position one's hands with one's forearms in this narrow position.

In FIG. 3 the hand grip sections 60 are shown bent rearward, in a side view, at an angle of approximately 25 degrees relative to a plane perpendicular to the inwardly extending sections 59. FIG. 4 also shows the hand grip sections 60 each being bent inwardly approximately 45 degrees from a vertical plane. As a result of these two bends, the hand grip sections 60 are also bent inwardly and rearwardly as seen from a plan view in FIG. 2. Although in this preferred embodiment of the invention, the hand grip sections 60 extend rearward in two dimensions; it is of course recognized that benefits of this feature can be achieved even if the hand grip sections 60 extend rearward only in one dimension, that is, either in a horizontal plane or a vertical plane parallel to the plane of the bicycle frame set.

The precise rearward angle of the hand grip sections 60 can be chosen for the comfort and preference of the cyclist. It has been found that the angles identified above provide a geometry for the hand grip sections 60 that accommodates the natural angles of the wrists and elbows when the cyclist's forearms are spread apart, such that the distance between the arms (forearms) is slightly greater than shoulder width. In contrast to the effect of the conventional aero bar design, which is to stretch the cyclist's arms, elbows, and wrists, the effect of the rearwardly extending hand grip sections 60 of the invention is to keep the cyclist's wrists, elbows, and arms in a comfortable position from which the cyclist's positioning of the hands, forearms, and arms can be altered or moved quickly and with strength.

The hand grip portion 61 of the handlebar assembly is shown from above in FIG. 2 (from the line 2—2 in FIG. 3) and from the front in FIG. 4 (from the line 4—4 in FIG. 3). The center plane of the bicycle, that is, the plane of the bicycle frame set, is identified in broken line at 65. In general the portions of the handlebar assembly on either side of the center plane 65 are generally mirror images of one another. The forwardly extending handlebar sections 58 extend generally parallel to the center plane 65. Handlebar sections 59 extend inwardly at approximately a 35 degree angle.

The connecting center section 62 serves several functions. It increases the rigidity and structural stability of the handlebar assembly, it serves to space apart the hand grip sections 60 so that the cyclist's hands do not interfere with one another, and it prevents possible head injury by eliminating what would otherwise have been a dangerously protruding handlebar section pointed toward the cyclist's head. The center section 62 is provided with openings 181 for the attachment of accessories such as gear changing levers or may be split at its center area for mounting shifting controls at the ends of the tubing.

Because the handlebar assembly and handlebar stem or steering post 52 of the present invention are dropped in front of the head tube 13, the front caliper brake assembly 32 should have as low a profile as possible in order to avoid interference with the cross piece 54 (see FIG. 15). When the front caliper brake assembly 32 is installed at its conventional location on the front of the front fork 30 near the bottom of the head tube 13, the center of the upper lever arm 70 of the brake assembly preferably is at or below the height of the center of the caliper pivot 71. Both the head tube 13 and steering post 52 may be manufactured in a wedged configuration, such that the tubing takes on a teardrop-like shape rather than a circular shape.

A handlebar stem or steering post 52 that may be used in conjunction with the invention is shown in FIGS. 5-7. The handlebar stem includes an attaching plate shield 80. The handlebar stem includes a frusto-conical steering post mount 82, which is formed principally of a two part core 83, that includes an outer core 87 and a concentric inner core 84. The core 83, which can be formed of steel, includes, at its lower end, a downwardly extending, threaded outer core 87 that is adapted to closely surround and screw onto the fork pipe 85 which is also threaded at its upper end. An inner core 84, preferably made of brass, is adapted to fit closely within the fork pipe 85 that extends upward from the front fork of the bicycle. The plate shield 80, formed of upper and lower portions when in position, form an aerodynamic wedge shape (see FIG. 6), which can be formed of aluminum, includes, at its upper end, an annular section 86. The annular section 86 also includes an upper cup: this upper cup, which is also referred to as a cone, houses bearings 89, preferably made of steel, and is adapted to seat on, or contain the bearings and a lower cup 90 which is used for housing the lower parts of the conventional bearings 89. The core 83 is fixed with respect to the plate shield 80 by two screws 88 that insert and lock into grooves on the core 83, so that there is not slippage between the core 83 and the plate shield 80 during use.

The core 83 includes a central opening to receive the threaded bolt 91. The head of the bolt 91 preferably is seated within a recess formed in the upper surface of the cover 83, and 83 is preferably seated within a recess formed in the upper surface of 82, as shown in FIG. 5. At its lower end, the bolt 91 engages a threaded center bore in the wedge nut 93. The wedge nut 93 is very long, extending significantly up into a second end of the inner core 84, so that a shorter and lighter bolt 91 can be used. To attach the handlebar stem to the bicycle, the inner core 84 and outer core 87 are slipped over the fork pipe 85, and the handlebar stem is lowered until the bearing housing's 89 race of the cone 79, is seated on the bearings 89. The bolt 91 is then tightened, thereby drawing up the wedge nut 93 against the interior diameter of the inner core 84 and causing the interior diameter of the inner core 84 not only to expand, but to rise slightly, clamping the core 83 to the fork pipe 85. The inner core 84 is slit on its sides, preferably symmetrically at two or four locations, at its lower end to facilitate its expansion in the clamping mode. It is important to note that the preferred handlebar stem 52 (and 52') (see FIGS. 18 and 19) of the present invention has a minimal vertical profile in relation to its immediate connection with the top of the head tube 13, and this part of the steering post is not vertically adjustable, but the part of the steering post, the plate shield 80 that attaches to this part of the steering post that is connected with the bicycle, is adjustable from this point, and the plate shield is adjustable from its connection with the bicycle. This is in contrast to a conventional handlebar stem in which different configuration in heights are attained by the bicycle steering post connection area being adjustable vertically. What adjusts the height of one's body parts in the invention is the steering post from its connection point with the bicycle and the non-bolt expansion described further below, although it is possible to include a joint or sliding channel (not shown) to adjust the height.

The top of the handlebar stem 52 is generally flat and provides a convenient surface in easy view of the cyclist where one can mount (e.g. via the two holes 81) an instrument assembly in a center portion of the steering post, can be mounted a desired instrument assembly. This can be, for example, a calculator, altimeter, odometer, and/or speedometer. In prior handlebar assemblies, the instrument assemblies generally needed to be positioned off to the side of the handlebar stem. The ability to position such an instrument assembly at a center portion of the steering post allows the cyclist to quickly find and view the instrument assembly without distortion or possible loss of balance that could arise from finding and viewing the instrument display at an angle. It alleviates the mount being away from the center of the bicycle making for less material having to be used to extend it to a center position for less weight.

The cross piece 54 of the handlebar assembly is connected to the handlebar stem 52 or 52' through a clamp formed by the clamp halves 92 and 94. The clamp half 92 is formed in the lower extent of the plate shield 80. The clamp half 94 is hinged to the clamp half 92 at pivot point 95 to enable the clamp to be opened and closed. A screw 96 extends through a hole at the end of the clamp half 94 opposite the pivot point 95 and is received by a threaded bore in the clamp half 92 when the clamp is closed. Together the clamp halves 92 and 94 define an annular sleeve that securely holds the cross piece 54 when the screw 96 is tightened. This clamp construction allows the handlebar assembly to be removed quickly and easily without requiring the removal of any parts of or any accessories that may be attached to the handlebar assembly, as is required in conventional handlebar designs. Also two edges 97 are for holding the crosspiece secure with minimal amounts of pressure from screw 96 applied to 94.

Figures 18, 19:
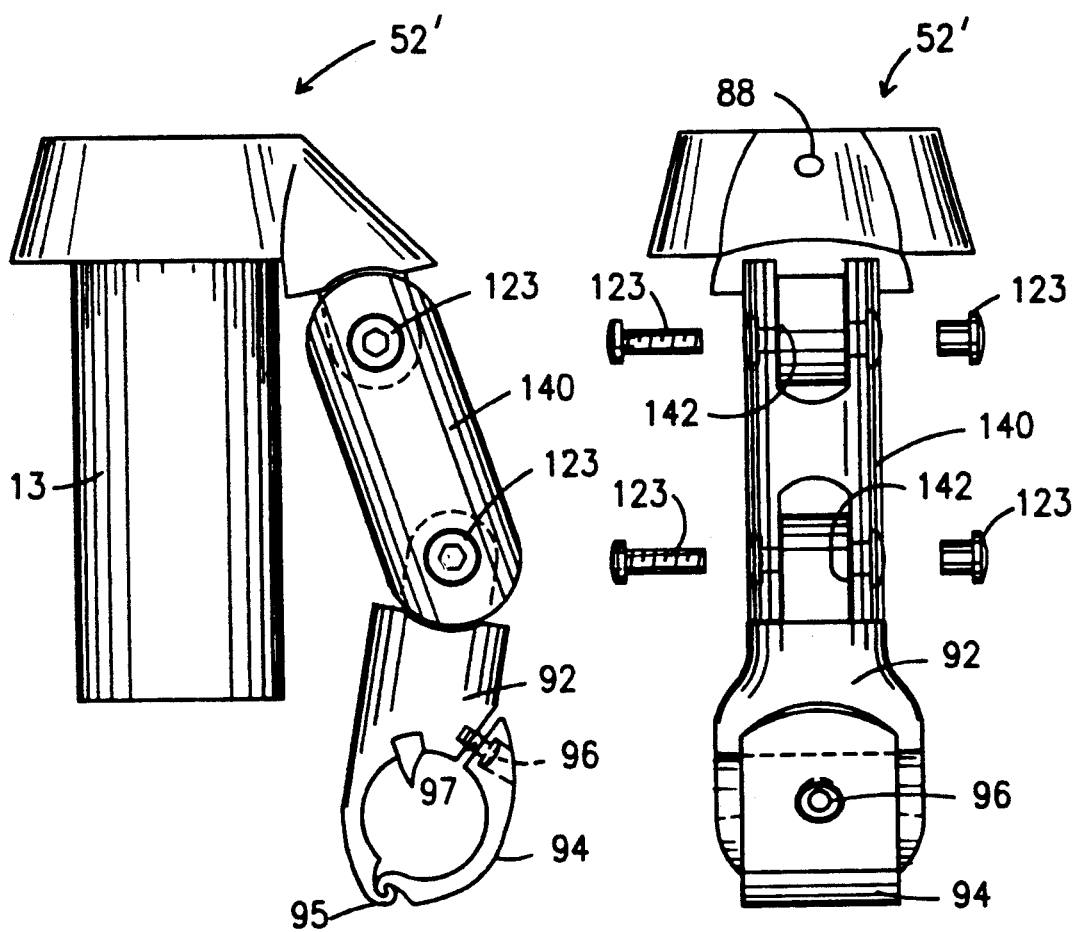
FIG. 18 is a side elevational view of a novel handlebar stem that can be used in conjunction with the invention as an after market product.
FIG. 19 is a front elevational view of the handlebar stem shown in FIG. 18.

The depending portion of the plate shield 80 can be of any suitable shape and can be made adjustable in height and reach using one or more joints, this being the after market version of the invention shown in FIGS. 18–19. Plate shield 80 can be conveniently formed with an aerodynamic cross-section as shown in FIG. 7. The rear surface of the plate shield 80 is generally convexed and preferably closely follows the shape of the head tube 13. The clamp halves 92 and 94 are positioned generally straight downwards of the rear surface of the plate shield 80, thereby positioning the clamped cross piece 54 further out of the way from the cyclist's knees and thighs during cycling.

Because of the depending portion of the plate shield 80, a middle portion of the cross piece 54 is positioned substantially lower than the top of the head tube 13. The particular length of the plate shield 80, using the after market version of the steering post, can be chosen to the preference of the cyclist. Neither steering post versions (52 and 52'), and its associated clamp (92 or 94) interferes any conventional braking system or other part or accessory attached to the front fork.

It should also be noted that it is not strictly necessary that the handlebar assembly be secured to the fork pipe through the top of the head tube 13 as just described. The handlebar assembly alternatively can be linked or secured with respect to the fork pipe at the portion of the fork pipe between where the fork pipe starts and ends vertically, or to the front fork itself, or in any other fashion that provides a rigid connection between the handlebar assembly and the front fork or fork pipe, while still positioning the handlebar assembly in gaining all the benefits that it provides.

The dropped construction of this handlebar stem design substitutes for the conventional, upwardly extending handlebar stem construction and offers several advantages over the conventional construction. Of principal importance is the ability of the cyclist to lean one's upper torso downward to a greater extent: this decreases one's profile and eliminates the air pocket. Also, one's limbs are not as stretched and respiration is better due to the wider arm and forearm positions. This provides a more relaxed and stable transfer of body weight downwards on the pedals of the bicycle during cranking. Because the cyclist's upper body parts are lowered, the cyclist's posture is more aerodynamic, and drag is reduced. Also the low profile of the handlebar stem design minimizes the interference of the handlebar stem with the cyclist's vision and the possibility of injury due to collision between the handlebar stem and the cyclist's face or head. This is of particular importance in the case of competition bicycles in which the wheel hubs are closer together and the cyclist's upper body leans over the handlebar stem to a greater extent.

A preferred construction of the arm rests 64 is shown in FIGS. 8–10: only one arm rest is shown in the Figures, the other arm rest is of the same construction. Each arm rest includes a base 100 in which the upper surface for supporting the cyclist's arm is of a concaved shape. In the illustrated embodiment, the support source is generally cylindrically shaped, and it defines a circular arc in front profile, although other concave shapes can of course be used. As best shown in FIG. 9, the support surfaces, or material, in the preferred arm rests have a radius of about 45 mm and define a generally circular arc between a first point on the first side and a second point on the second side of the support surface; either of these points is at least one-half inch above a lowest point of the material. The outboard side of the arm rest 64 preferably is raised relative to the inboard side. Accordingly the support surface is formed to be about 20 degrees rotated from center toward the outboard side of the bicycle. Also the inboard and outboard sides can be of the same extension so long as the depth from the furthest most points of the sides from the closest most center points of the base of the arm rests are deeper than one-half inch. Also the arm rest can be a non-segmented enclosed configuration for insertion of one's arms. In which case all the above variations in arm rest designs provide the same benefits.

For increased comfort a resilient lining 102, which can be made of Vinyl/Nitrite, is provided on the concave support surface of the base 100. The arm rest base 100 is secured to the handlebar assembly through a bracket formed of upper bracket half 104 and lower bracket half 106. The bracket halves 104 and 106 form a clamp through screws 107 that releasably secures the arm rest at a desired location on the handlebar assembly.

The base 100 and its support surface preferably are made to be adjustable in at least the horizontal and vertical planes, but can be made to adjust in three dimensional positions by the implementation of a ball and socket means connecting base 100 with 105. Such an assembly permits unrestricted rotating and securing of the support surfaces in any angle. Thus, as shown in FIGS. 8–10, the upper bracket half 104 includes a circular laterally channeled opening 105 that rotatably seats within a closely corresponding circular laterally channeled opening in the bottom of the base 100. The base 100 also includes a cut-out 110 and an adjustment screw 108 which engages the opposite sides of the base 100 defining the cut-out 110. When the screw 108 is tightened through the recess 109, the opposite sides of the cut-out 110 are drawn together, thereby causing the opening in the bottom of the base 100 to constrict around the circular laterally channeled opening 105 creating a frictional lock between the base 100 and the upper bracket half 104. To adjust the base 100 and its concave support surface in the horizontal plane, the screw 108 is loosened to permit the base 100 to be rotated relative to the circular laterally channeled opening 105 and the desired position is locked in by retightening the screw 108. Of course many other suitable positioning means can be used with the arm rests without detracting from the invention.

In principal it is not required that the arm rests 64 have the construction described above. At a minimum the arm rest portions of the handlebar assembly need only be some structure that serves to securely support the cyclist's arms in more than one direction while cycling. The most straightforward way to achieve this function is to provide a portion of the handlebar assembly itself at the location of the arm rests, provided it gives the same benefits of the rests, that is, at slightly wider than shoulder width and about level of the top of the head tube 13, depending on the height of the seat. In this regard the forwardly extending sections 58 may themselves serve as the arm rests.

The spacing of the arm rests 64 provides several advantages. Compared with the placement of arm rests in conventional handlebar assemblies, which typically are close to the handlebar stem, the placement of the arm or forearm rests at slightly wider than shoulder width are a more natural and comfortable position for the cyclist. Particularly in instances of bicycling over extended distances, the wider arm positioning provided by the arm rests 64 reduces the cyclist's fatigue. The wider arm positioning also minimizes the constriction of the cyclist's chest, thereby, in a sprint, making it easier for the cyclist to breathe quickly which is important in view of the increased respiratory rate during cycling and particularly during competition.

In conjunction with a handlebar stem 52 and 52' having a low profile, the wider arm rest positioning also permits the cyclist's upper torso to lean downward between his arms to a greater extent relative to the body position of a cyclist using a conventional handlebar assembly. The cyclist's upper torso and arms thus acquires a lower, more compact, coiled posture that facilitates the pumping action of the cyclist's legs and feet, and thereby increases the cyclist's cranking power and leverage on the pedals of the bicycle. Ideally the cyclist's shoulders are dropped so that a line drawn from the cyclist's hips to the shoulders forms an angle equal to or below horizontal with no drop in any body parts between these two points.

When the cyclist is in the riding position with his arms, including his forearms or elbows, resting on the arm rests 64, the front wheel and fork are turned to steer the bicycle in part by the cyclist selectively applying pressure to the arm rests through his arm. Owing to their increased spacing, the arm rests 64 provide the cyclist with greater steering leverage. The handlebars, and consequently the front wheel, can be turned more smoothly and with more control which is particularly advantageous in preventing a fall when making turns at high speeds on an unstable or slick riding surface, or to avoid an obstacle, or in a mass start event where the bicycle riders are obstacles. Because the arm rests 64 provide support without restricting the cyclist's ability to remove his arms from the arm rests, the cyclist can also easily and quickly adjust his arm and body positioning in the event of an imminent fall or collision or in making the transition from a normal riding body posture to a semi-standing posture for accelerating quickly. In the event of a fall, it is easier for the cyclist to better position his body on top of the bicycle instead of falling under the bicycle.

FIGS. 11-13 show the detailed construction of a preferred joint that can be used in the handlebar assembly to connect the generally upward and backward extending support sections 56 to the generally forward extending sections 58 and to connect the latter to the inwardly angled sections 59 or 172 (see FIG. 3). Each joint 55 and 57 is generally spherical in shape and includes a serrated male half joint 120 adapted to seat within the opening 121 in a female half joint 122. One joint half is secured to one section of the handlebar assembly, and the other joint half is secured to another section of the handlebar assembly to which the first section is to be joined. The joint halves can be formed integrally with their respective handlebar sections, or they can be secured to the handlebar sections by any convenient fastening means. A screw 123 is threaded through each joint half 121, 122 and, when tightened, locks the joint in a desired angular position. The overall diameter of each joint preferably is about the diameter of the handlebar tubing so that the joints do not significantly protrude beyond the diameter of the tubing and do not interfere with the cyclist's grip at any angle the tubing is positioned at.

Because the joints 55 and 57 are each separable, a wide variety of handlebar constructions are possible. For example (see FIG. 3), the forwardly extending sections 58 may be eliminated entirely, so that the upward and backward extending support sections 56 may be connected directly, through joints such as 55 and 57, to the inwardly angled sections 59. In this case the angled sections 59 may be of greater length to compensate for the length of the eliminated sections 58 and may include forwardly extending portions as well as angled portions. Alternatively the entire hand grip portion 61 of the handlebar assembly can be replaced at the option of the cyclist by a hand grip portion of a different configuration, including, for example, one having a different geometry for the rearwardly extending hand grips 60.

Seen in FIGS. 12-13 is the non-bolt expansion means or device in which the length of forwardly extending sections 58 and the height of the support sections 56 are adjustable. Opening 160 of support sections 56 and opening 144 of forwardly extending sections 58 are for insertion of an allen wrench into the center of an oval disk 148 having hexagon shaped inner sides and by twisting these two, implements the non-bolt expansion means. In other words, by torquing the oval disk 148 against the oval lengthwise inner sides of tubing contact 152, this implements the non-bolt expansion means, expanding the two or more split sides of tubing contact 152 against tubing 130. The oval disk 148, at its center opening, is held in place by bolt 146 using conventional means. Spacing parts 154 are made of lightweight material, preferably plastic, and different size lengths are available for implementing a change in the height of support sections 56 and length of forwardly extending sections 58. The non-bolt expander holder 150, the tubing contact 152, and the oval disk 148 are made of aluminum, and bolt 146 is made of steel.

Figure 16:
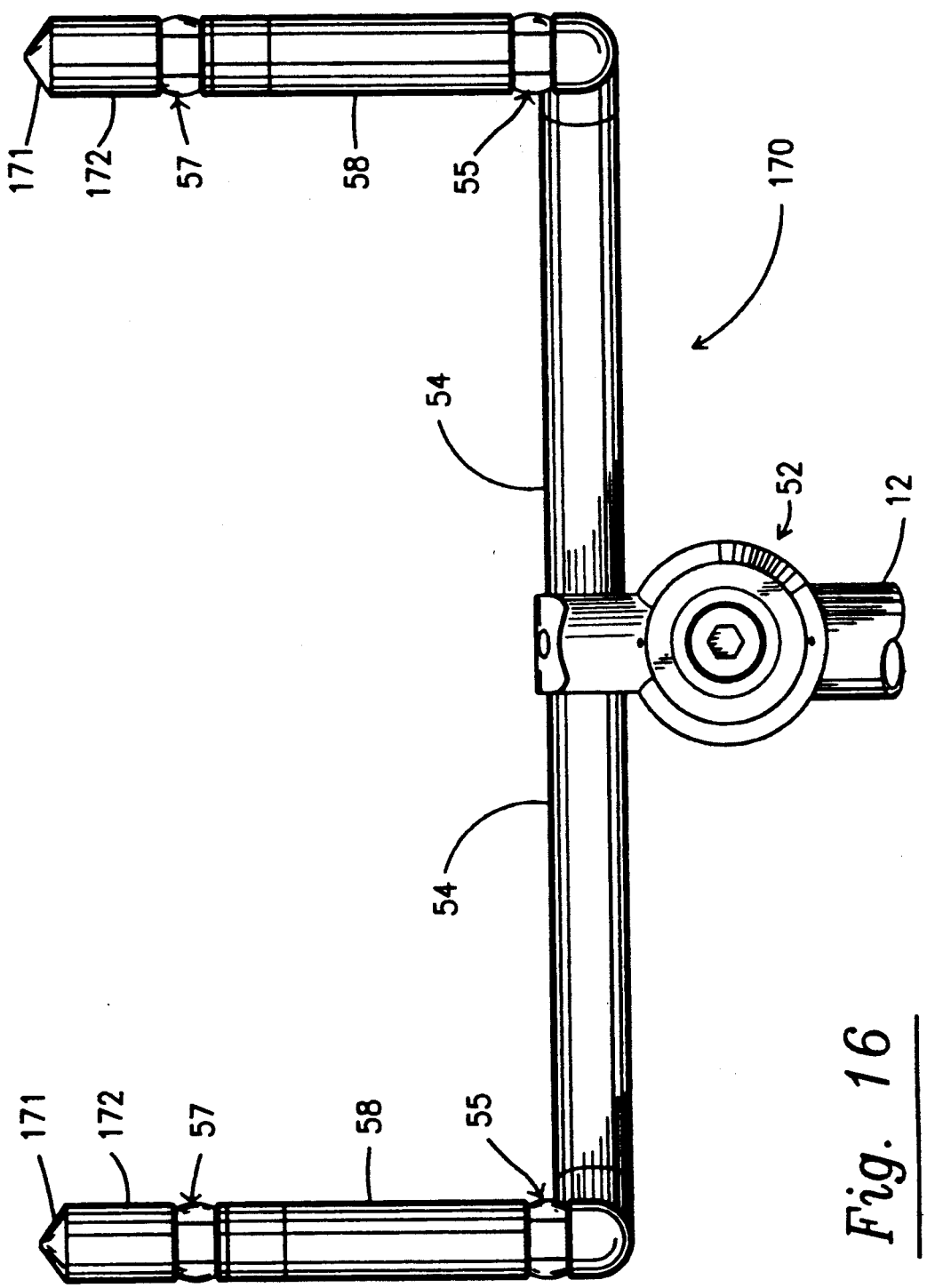
FIG. 16 is a top plan view of the handle bar assembly without the hand grip attachment portions; the regular handlebars.
Figure 17:
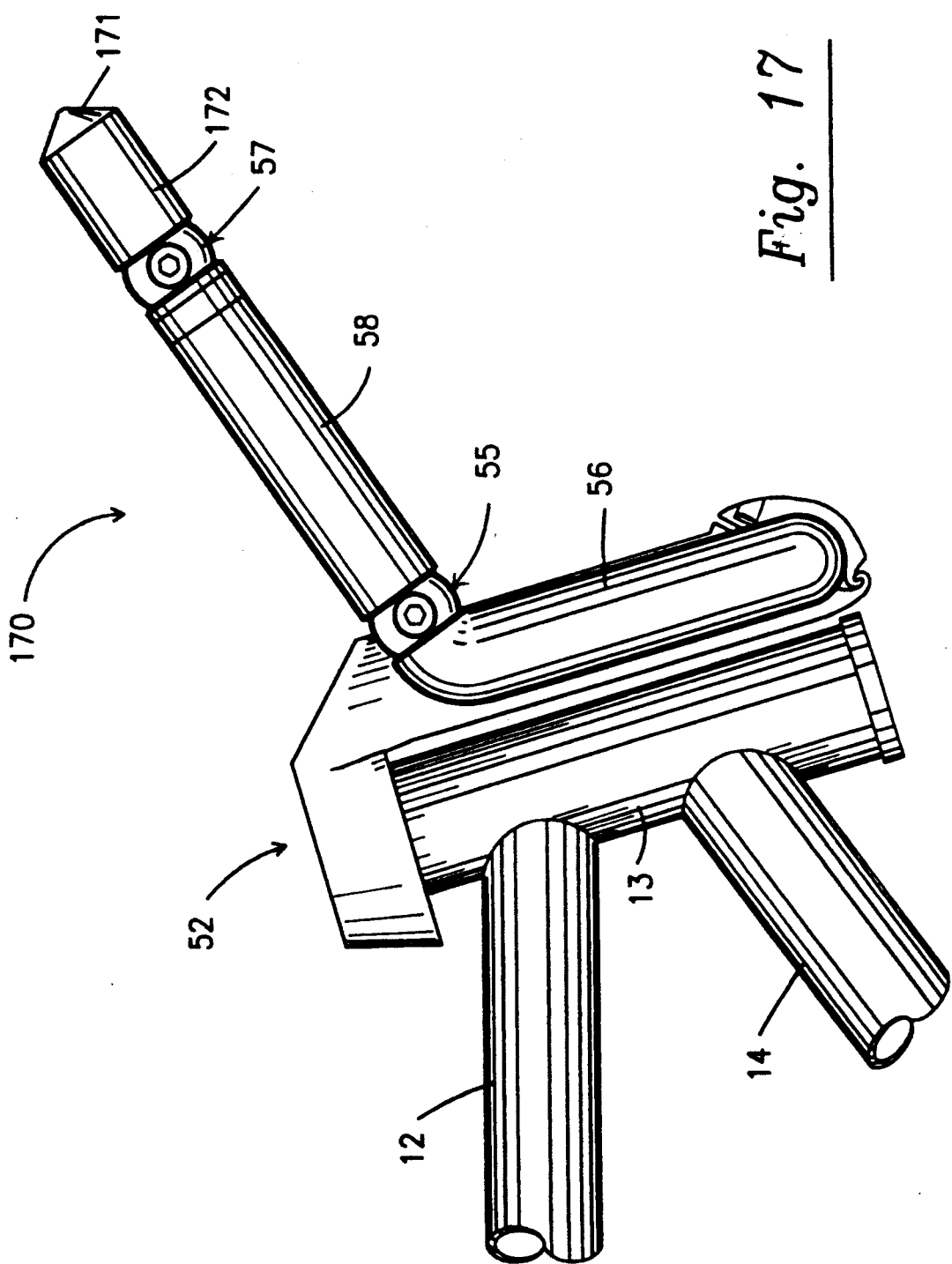
FIG. 17 is a side elevational view of the regular handlebars shown in FIG. 16.

A top plan view of FIG. 13 (see FIG. 16) 170, shows a replacement to 61: portions 172, to which hand brake levers not shown, can be attached and attached to these portions are conventional handlebar end caps 171.

Seen in FIGS. 18 and 19 is the aftermarket version of 52 which is 52'. 142 are two joints identical to the ones in FIG. 11 which enables the plate shield 140 to pivot or rotate raising or lowering the cross bar 54 vertically and horizontally making for a three dimensional positioning of 54 and consequently the handlebar assembly. 140 is the plate shield of 52' and is of a different configuration to allow for adjusting the positioning of the handlebar assembly from the steering post (plate shield).

FIG. 14 illustrates how the invention works to allow for greater cranking leverage by the cyclist. The figure 122 in solid lines represents a cyclist using a preferred embodiment of the invention: the FIG. 120 in phantom lines represents a cyclist using a conventional aero bar handlebar assembly and handlebar stem.

In a conventional bicycle, the seat post 22 and the seat tube 16 are rotated rearward about seventeen degrees from vertical. According to invention, the seat post 22 and seat tube 16 can be positioned at or near vertical: this moves the saddle forward and provides the cyclist with the maximum cranking angle, from approximately the 12 o'clock position of the crank and pedal down through approximately the 6 o'clock position where the cyclist's leg will be essentially vertical.

Because the saddle can be moved forward when the invention is used, the positioning of the cyclist's arms and forearms are moved backward relative to their position in the case of a conventional aero bar handlebar assembly. The resulting difference in posture of the cyclist is key. The aero bar assembly urges the cyclist into an elongated body posture in which the cyclist's arms are extended forward. The goal there is to minimize the cyclist's front profile by decreasing the pocket from the hips to the middle of the stomach, and the arms and forearms are brought in closer to center in order to reduce drag, but the cyclist is in a less stable position: the cyclist's stomach and chest are lowered in position to other body parts and may interfere with the cyclist's thighs during cranking, and the cyclist's lower back is angled forward significantly which decreases the flexibility and power of the cyclist's legs.

In the invention, however, the arm position is closer to the body length wise and, more particularly, closer to the saddle regardless of whether or not the feature of a vertical seat post is utilized. The cyclist's posture is not elongated, but is more compact or coiled. The cyclist's upper torso is arched to a greater extent, while the cyclist's lower back remains more erect. Because the upper torso is arched, the cyclist's stomach and chest do not interfere with the cyclist's thighs during cranking, and there is no pocket making for a more aerodynamic body position while riding.

Also, there is less leg and lower torso fatigue while lowering the shoulders. The more erect positioning of the lower back provides more flexibility in the applicable muscles, because they are not as stretched, allowing for a more comfortable riding position on all types of bicycles with different seat angles, and the closer the arms, forearms, and shoulders are length wise to the torso position: this will allow one's body parts to work together in pushing and pulling the pedals easier, faster, stronger, and smoother for a more efficient and powerful cranking stroke attained and credited to the more powerful leg angles enhanced by using a more vertical seat angle, yet still allows for flexibility of the applicable muscles. More specifically, the use of the new handlebar design advantageously permits the cyclist to use more of the more powerful anterior upper leg muscles, the quadriceps, when pushing on the pedals, while pulling harder and faster with the posterior upper leg muscles, the hamstrings, due to the wedging effect brought about by the different position of the torso, arms, and forearms, resulting in quicker and stronger contractions of the muscles during cycling. This is achieved with less fatigue because the cyclist's lower back and gluteus maximus muscles are more erect in relation to the shoulders, arms, and forearms. The result is a more powerful rotation of the crank and a longer powered portion of the crank if one is using a bicycle with a more vertical seat angle which can only be optimally implemented using this invention. The invention affords about 15 degrees more rotation in the power turn, and the total power turn approaches the maximum of 180 degrees when the seat post and seat tube of the bicycle are oriented at or near vertical which is race legal.

Using the new handlebar assembly, a cyclist can increase the downward force of the feet on the pedals of a bicycle with a steeper seat angle to achieve a longer stroking length and greater rotational speed of the crank during the power turn and thereby achieving even greater performance. Using a bicycle within a broad range of seat angles, the cyclist can effectively wedge oneself between the saddle and one's contact points on the handlebar assembly and apply a force on the pedals greater than one could using any known bicycle product for this purpose.

There is also a more stable distribution of the cyclist's body weight with the invention. Although the cyclist's center back may be slightly higher when the invention is used, there is no increase in drag. Owing to the construction of the new handlebar assembly, the cyclist's upper torso and head are lower and in a more streamlined configuration than in the case of prior handlebar assemblies, thus offsetting any additional drag created by the increased arching of the cyclist's back and increased width of the cyclist's arms.

In other words, by directly changing the cyclist's hand and arm positions on the handlebar assembly, the invention indirectly changes the cyclist's posture. The increased cranking force or leverage provides greater torque which in turn provides greater and easier acceleration. As one consequence a cyclist can achieve and maintain higher bicycling speeds using the invention.

Thus, using the preferred design of the handlebar assembly and handlebar stem, the cyclist's stomach is positioned higher and allows increased room for the cyclist's knees and thighs, and more room is provided for better arm, chest, and head clearance as well. The body positioning provided by the invention lessens the fatigue and increases the speed of the cyclist during longer cycling events and particularly during mass start competition events which are crowded and are not typically lengthy. Also, because the cyclist's body is in a more relaxed posture, the cyclist can more quickly and precisely reposition his hands, arms, and other body parts in order to make sudden steering corrections or to take evasive maneuvers for avoiding an accident or other obstacle.

What is claimed is:

1. An improved bicycle handlebar assembly comprising armrests adapted to position a user's arms such that a distance between the user's arms is greater than a maximum width of the user's shoulders, wherein said armrest are adapted to resist a first lateral force directed generally outwardly from a frame of the bicycle, said first lateral force is acting to displace the users arms from said armrests and wherein a portion of said handlebar assembly comprises a plurality of hand grip positions.

2. The handlebar assembly of claim 1 further comprising a plurality of tubular segments, wherein said segments are adjustable in length.

3. The handlebar assembly of claim 2, wherein said joints comprise two allen heads for added torque.

4. The handlebar assembly of claim 1 wherein said armrest is further adapted to resist a second lateral force directed generally forwardly from said frame, said second force acting to displace the user's arms from said armrests.

5. The handlebar assembly of claim 1 further comprising a plurality of tubular segments and a lockable joint pivotably connecting two of said segments, wherein an outer diameter of said joint is generally equal to an outer diameter of said segment and wherein said outer diameter of said joint remains substantially constant when said two said segments are pivotably adjusted.

6. A bicycle handlebar assembly, comprising a composite tubular member adjustable in length, said composite member comprising
   an outer tubular member,
   an inner tubular member adapted to slide axially within said outer member, said inner member including an expandable portion thereof,
   an aperture at an end of said tubular member, and
   an expander retained within said expandable portion, said expander adapted to be rotated by means of a tool inserted into said aperture, said rotation acting to expand said expandable portion and to thereby frictionally lock said inner member to said outer member.

7. The handlebar assembly of claim 6 wherein said expander comprises a non-circular disk.

8. An improved handlebar assembly comprises a hand grip position located approximately the length of a user's forearm, forward of a crossbar disposed on a portion of said handlebar assembly, said portion having a first and a second end, said first end relatively distal from said crossbar and said second end relatively proximal to said crossbar, said second end located nearer a fictitious plane central to a steered wheel of said bicycle than is said first end of said portion.

9. The handlebar assembly of claim 8 wherein said second end of said portion is higher than said first end.

* * * * *